(12) United States Patent
Gunter et al.

(10) Patent No.: US 7,067,995 B2
(45) Date of Patent: Jun. 27, 2006

(54) LED LIGHTING SYSTEM

(75) Inventors: John B. Gunter, Flower Mount, TX (US); George Berman, Plano, TX (US); Valeriy K. Berger, Plano, TX (US)

(73) Assignee: Luminator, LLC, Plano, TX (US)

(*) Notice: Subject to any disclaimer, the term of this patent is extended or adjusted under 35 U.S.C. 154(b) by 177 days.

(21) Appl. No.: 10/650,003

(22) Filed: Aug. 27, 2003

(65) Prior Publication Data
US 2004/0135524 A1 Jul. 15, 2004

Related U.S. Application Data

(63) Continuation-in-part of application No. 10/345,060, filed on Jan. 15, 2003.

(51) Int. Cl.
*H05B 37/00* (2006.01)

(52) U.S. Cl. .................. 315/312; 315/362; 315/294; 315/309; 345/83; 345/101; 362/800

(58) Field of Classification Search ............... 315/312, 315/316, 360, 362, 292, 294, 297, 309; 345/82–84, 345/101; 340/815.45, 332; 257/88, 89; 362/800
See application file for complete search history.

(56) References Cited

U.S. PATENT DOCUMENTS

| | | | | |
|---|---|---|---|---|
| 4,298,869 A | * | 11/1981 | Okuno | ................. 345/82 |
| 6,150,774 A | | 11/2000 | Mueller et al. | |
| 6,720,745 B1 | * | 4/2004 | Lys et al. | ................. 315/312 |
| 2001/0028227 A1 | | 10/2001 | Lys et al. | |

* cited by examiner

*Primary Examiner*—Haissa Philogene
(74) *Attorney, Agent, or Firm*—Jenkens & Gilchrist

(57) ABSTRACT

Method and system are disclosed for compensating for color variations due to thermal differences in LED based lighting systems. The method and system involves characterizing the LEDs to determine what PWM (pulse-width modulation) is needed at various operating temperatures to achieve a desired resultant color. The characterization data is then stored in the microprocessor either in the form of a correction factor or as actual data. When an operating temperature that is different from a calibration temperature is detected, the characterization data is used to adjust the PWM of the LEDs to restore the LEDs to the desired resultant color.

29 Claims, 6 Drawing Sheets

LED LIGHTING SYSTEM

CROSS REFERENCE TO RELATED APPLICATIONS

This application is a continuation-in-part of U.S. Utility application Ser. No. 10/345,060, entitled "LED Lighting System," filed on Jan. 15, 2003, which is hereby incorporated by reference.

FIELD OF THE INVENTION

The present invention is directed to light emitting diode (LED) based lighting systems and, in particular, to a method and system for compensating for color variation in the LED due to temperature differences.

BACKGROUND OF THE INVENTION

Lighting systems based on LEDs have an advantage over traditional fluorescent lighting systems in that they can be controlled to vary both their color and brightness. Through an appropriate combination of these two parameters, subtle lighting effects such as sunrise, sunset, and mood lighting can be achieved. Because of this and other advantages, LED based lighting systems are rapidly replacing traditional fluorescent lighting systems in a number of environments, including transportation, military, commercial, and home environments.

A typical LED based lighting system employs at least three different colors of LEDs, for example, red (R), green (G), and blue (B), arranged in a repeating array. The colors can be combined in different proportions to produce thousands of resultant colors (e.g., white) when viewed by the human eye. FIG. 1 shows a general layout of a portion of a basic LED based lighting system 100. The system 100 has a microprocessor 102, a power supply 104, and one or more arrays of LEDs 106, 108. Each array 106, 108 includes a number of red, green, and blue LEDs, one of which is shown at 110. Within each array, LEDs that emit the same color have their cathode and anodes electrically tied together to form a channel. Each channel is controlled by the microprocessor 102 independently of the other channels, both within a given array and also from array to array in some cases.

Although only one microprocessor 102 is shown, most applications will have multiple microprocessors 102 controlling multiple sets of LED arrays 106, 108. It is also possible to have one microprocessor controlling a single LED array. In a typical installation, one microprocessor controls one light fixture, which can include several LED arrays. Additionally, although the arrays 106, 108 show an equal number of red, green, and blue LEDs, in some applications, there may be more or fewer of one color than others. Moreover, some arrays may have a higher or lower total number of LEDs than others. It is also possible to have an array with only one LED for each of the constituent colors.

In operation, a user selects the resultant light output (e.g., white) for the desired LED arrays 106, 108 via a global control unit (not expressly shown). The global control unit then relays the desired resultant color to the appropriate microprocessors 102. Each microprocessor 102 controls the relative intensity level of the channels within its set of arrays to achieve the desired resultant color. The intensity level of a channel is controlled using pulse-width modulation (PWM) of a fixed current source (e.g., 20 mA, 40 mA, etc.) provided by the power supply 104. The power supply 104 is connected to the LED arrays 106, 108 via a plurality of switches (not expressly shown) in either a common anode or a common cathode configuration. Each microprocessor 102 then modulates the current for its LED channels by turning on and off the appropriate switches, which may be any suitable switching device (e.g., a field effect transistor (FET)).

Within each microprocessor 102, a PWM algorithm 114 adjusts the PWM for each channel to achieve the desired resultant color. PWM allows linear control of the intensity level of the LEDs; that is, the intensity level of an LED is directly proportional to the width of the pulse. The algorithm 114 uses pre-stored calibration data to determine the PWM that should be applied to each channel to achieve the resultant color. By varying the PWM of the different channels, it is possible to generate thousands of different resultant colors.

Successful execution of the above LED based lighting system 100 requires that the individual LEDs 110 within a channel of a given array be closely matched in intensity (brightness) and wavelength (color.) Ideally, every LED of a particular color would have the same intensity and wavelength. In reality, the LED manufacturing process is not perfect, and manufacturers have to bin (sort) the LEDs by intensity and wavelength. For an LED of a given color, it is common to have six or more different bins. Thus, an array with three different colors could theoretically require up to 216 different bins to cover all the possible combinations.

The logistics of managing so many bins is both complex and expensive. A more economic solution is to closely match the intensity and wavelength of LEDs of a given color on a single array, but permit variation from array to array. A calibration process can then be used to normalize the resultant output on an array by array basis so that multiple arrays produce substantially the same color when governed by a global command. The calibration process generates the maximum possible intensity at a specific color target. The color target is identified using the CIE (Commission Internationale de l'Eclairage) chromaticity coordinates u' and v'. The coordinates for "High White," for example, are u'=0.2221 and v'=0.5024. Any combination of red, blue, and green that results in these coordinates will produce a High White color. The PWM for each channel that generates the maximum intensity level at the target color is then stored in the microprocessor.

Unfortunately, the intensity level of an LED changes with temperature, which can cause a drift in the LED's color. And while the human eye is relatively insensitive to variations in the intensity (brightness) of a given color, it is very sensitive to variations in the color (wavelength) itself. A shift of 3–4 nanometers in the wavelength of a LED creates a color shift that is noticeable to the human eye. Since the resultant color generated by the lighting system is composed of three or more colors, a minor shift in output of any one of the component colors may lead to visible color shifts. The charts in FIGS. 2A–2B show examples of how the u' and v' parameters can change with temperature. As the temperature of the LED rises, its output drops, which changes the u' and v' parameters. This intensity drop varies for each LED color, since the different colors are based on different LED technologies.

In typical installations, the LED arrays for the same microprocessor and/or different microprocessors are placed in different locations and may be exposed to different thermal environments. For example, in airplane cabin lighting systems, one array or set of arrays may be installed under an air conditioning vent while a second array or set of arrays is installed in a warmer spot. Since the LEDs at the different locations now operate at different temperatures relative to each other, the resultant color produced at those locations will be different relative to each other. If the difference in temperature is large enough, there will be a significant variation in output color between the locations.

Accordingly, what is needed is a way to compensate for thermal differences in LED based lighting systems. More specifically, what is needed is a way to adjust the PWM of the LEDs to compensate for differences in the temperature of the operating environment.

BRIEF SUMMARY OF THE INVENTION

The present invention is directed to a method and system for compensating for color variations due to thermal differences in LED based lighting systems. The method and system of the invention characterizes the LEDs to determine what PWM is needed at various operating temperatures to achieve a desired resultant color. The characterization data is then stored in the microprocessor either in the form of a correction factor or as actual data. When an operating temperature that is different from a calibration temperature is detected, the characterization data is used to adjust the PWM of the LEDs to restore the LEDs to the desired resultant color.

In general, in one aspect, the invention is directed to a method of compensating for color variation due to temperature change in an LED based lighting system that has at least one LED array, wherein same color LEDs are electrically connected to form LED channels. The method comprises determining a pulse width needed for at least one LED channel to achieve a predetermined target color at at least a first and a second temperature, calculating a pulse width correction factor for the at least one LED channel based on the pulse width needed to achieve the predetermined target color at the at least first and second temperatures, and correcting the pulse width for the at least one LED channel using the pulse width correction factor to achieve the predetermined target color.

In general, in another aspect, the invention is directed to an LED based lighting system with thermal compensation capability. The system comprises at least one LED array having same color LEDs electrically connected to form LED channels, a microprocessor connected to and independently controlling each LED channel of the LED array to achieve a desired resultant color, and a temperature sensor connected to the microprocessor for detecting an operating temperature of the at least one LED array. An algorithm stored on the microprocessor is configured to cause the microprocessor to compensate for differences in the operating temperature of the at least one LED array.

In general, in yet another aspect, the invention is directed to a method of compensating for color variation due to temperature change in an LED based lighting system that has at least one LED array, wherein same color LEDs are electrically connected to form LED channels. The method comprises deriving a temperature compensation curve for the LED array, calculating a correction factor for at least one LED channel based on temperature compensation curve, and compensating for differences in an operating temperature for the LED array.

In general, in still another aspect, the invention is directed to a method of calibrating an LED based lighting system that has at least one LED array, wherein same color LEDs are electrically connected to form LED channels. The method comprises the steps of stabilizing the LED channels, maximizing an intensity level of one of the LED channels, and adjusting an intensity level of at least one other LED channel until a predetermined target color is achieved. The method further includes the step of repeating the above steps after a predetermined amount of time.

BRIEF DESCRIPTION OF THE DRAWINGS

A better understanding of the invention may be had by reference to the following detailed description when taken in conjunction with the accompanying drawings, wherein.

DETAILED DESCRIPTION OF THE INVENTION

Figure 1:
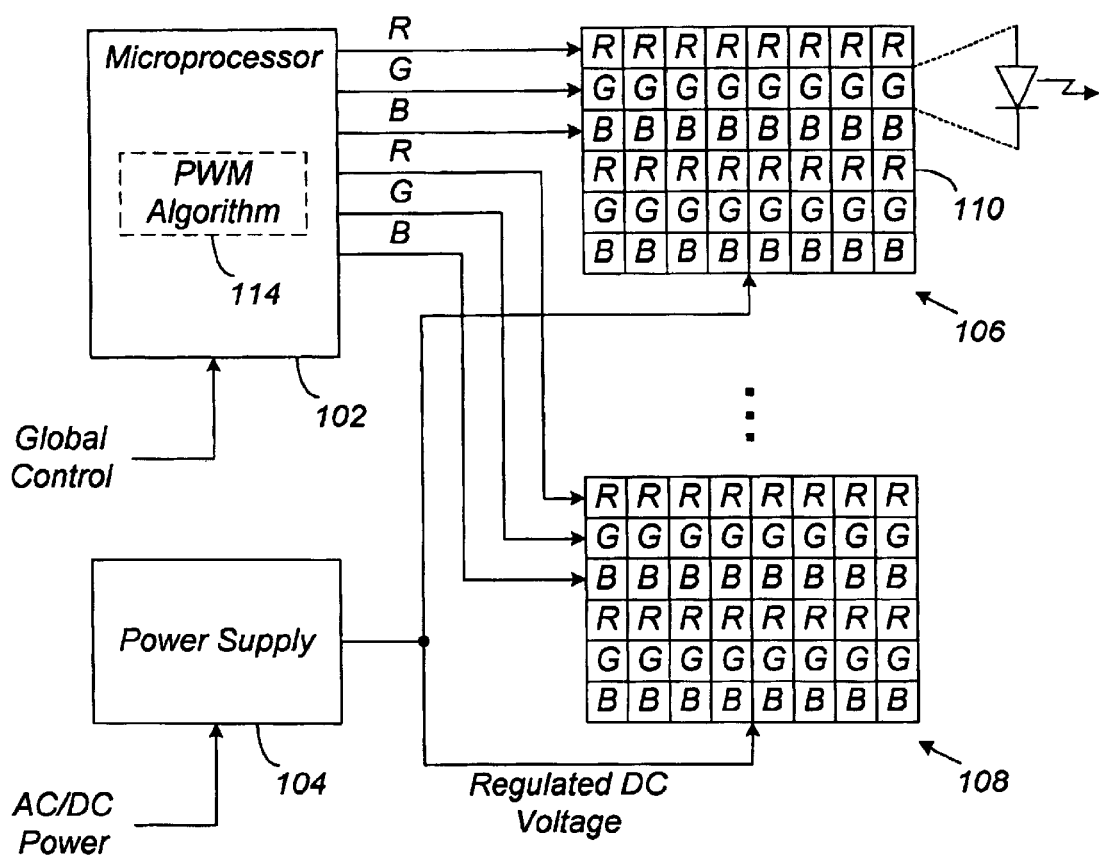
FIG. 1 is a block diagram of a portion of an LED based lighting system.
Figure 2A:
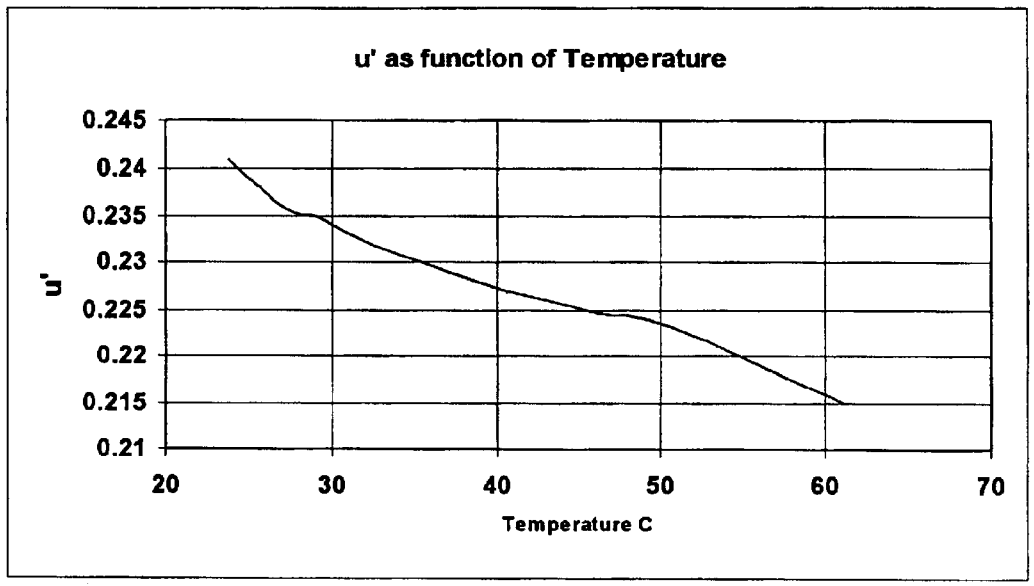
FIGS. 2A–2B are line graphs showing changes in the u' and v' parameters with respect to temperature.
Figure 2B:
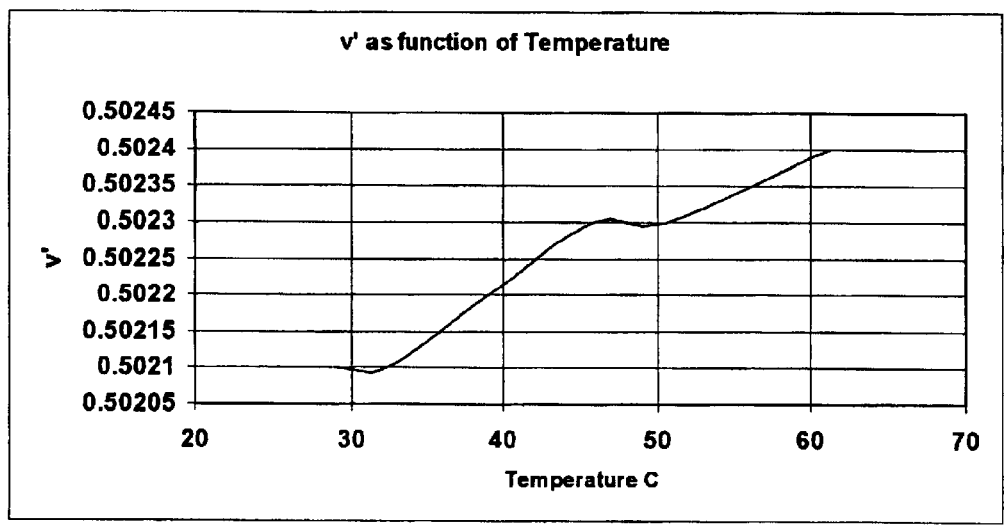

Following is a detailed description of embodiments of the invention with reference to the drawings wherein numerals for similar elements are carried forward.

As mentioned previously, embodiments of the invention provide a method and system for compensating for color variations in an LED based lighting system due to changes in the operating temperature. The method and system of the invention involves calibrating the LEDs at a calibration temperature to produce a desired resultant color. The LEDs are then characterized at one or more different temperatures to determine a compensation curve. This compensation curve is then used to adjust the PWM of the LEDs to produce substantially the same desired resultant color under a different operating temperature.

The calibration temperature may be any suitable temperature, but is typically the temperature of the LED array after the LEDs have been powered on using some predefined PWM for some predefined calibration period (e.g., about an hour). This temperature is usually higher than the ambient temperature and may be as high as 55° C. in some cases. In accordance with embodiments of the invention, the calibration process determines the maximum intensity level that can be generated by the LEDs at the calibration temperature while maintaining the desired resultant color. Of the three colors contributing to the resultant light output of an array, usually only two of the colors are adjusted to achieve the resultant color output. Therefore, in a typical case, the intensity level of one of the colors will be maximized, then the intensity levels of the other two colors will be adjusted until the resultant color is achieved. In some embodiments, the color with the lowest maximum intensity level (i.e., the "weak link") is the one that will be maximized, although it is possible to maximize one of the other colors instead. In either case, the intensity levels of the other colors will be adjusted until the array reaches the target u' and v' values. The PWM values for each color are then stored in the microprocessor(s) and subsequently used to produce the desired resultant color.

In some embodiments, it is also possible to adjust only a single color until the desired resultant color is achieved.

In some embodiments, a two-pass calibration process may be used instead of the one-pass calibration process described above. In the two-pass calibration process, a second calibration pass similar to the first calibration pass is performed within a predefined amount of time after the first calibration pass. The reason for performing the second calibration pass is because, in some cases, there may be a significant difference between the temperature of the LEDs at the end of the warm-up period versus after calibration. This difference may be due, in part, to the difference in the power consumption characteristics of the LEDs as well as other factors. For example, the PWM obtained in the first calibration pass may cause, or may be one factor that causes, the LEDs to stabilize at a lower/higher temperature than the temperature at calibration. Thus, after the LEDs have been operating at this PWM for some time, their temperature will have drifted away from the temperature at calibration. If the temperature drift is large enough, the corresponding change in the resultant color may become noticeable to the human eye.

Therefore, in some embodiments of the invention, a second calibration pass is performed after the LEDs have been operating for some predefined amount of time (e.g., about an hour) at the PWM obtained from the first calibration pass. The new PWM obtained from the second calibration pass may cause the LEDs to stabilize at a temperature that is different than that of the first PWM. It has been found, however, that the difference in the two temperatures is not sufficiently large to cause a noticeable change in the resultant color for most people. The second of the two temperatures may then be used as the calibration temperature.

Figure 3:
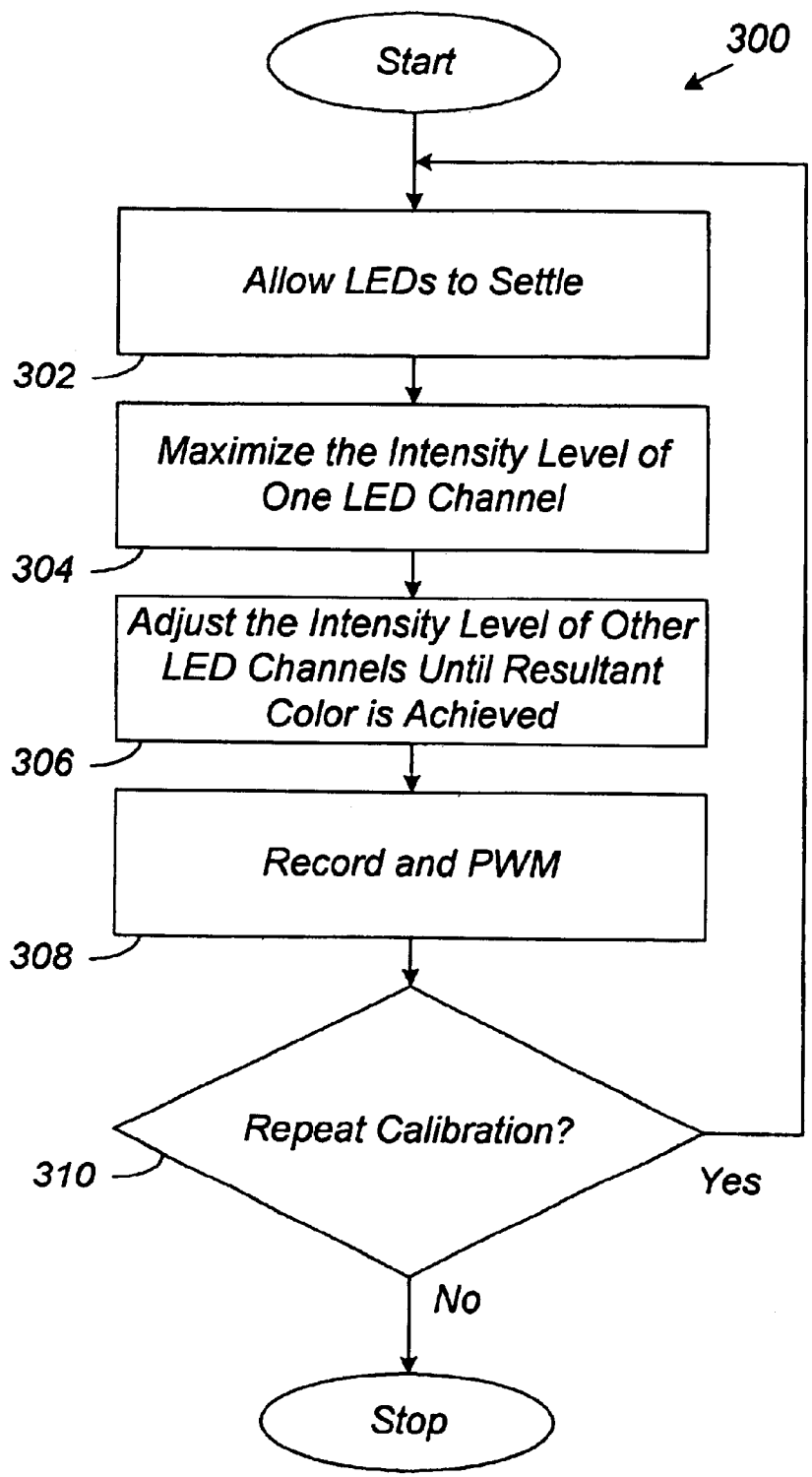
FIG. 3 is a flowchart for a calibration process according to embodiments of the invention.

FIG. 3 illustrates a two-pass calibration process 300 according to embodiments of the invention in the form of a flowchart. At step 302, the LEDs of the array being calibrated are allowed to stabilize or settle for a predefined period of time (e.g., about an hour). At this time, if they have not been through any calibration yet, then the LEDs are warmed up to their stabilization point. At step 304, the intensity level of one of the LED channels (color) is maximized. Preferably, the LED channel with the lowest maximum intensity level is maximized, but it may be any LED channel. The intensity levels for the other LED channels are then adjusted until the desired resultant color is achieved at step 306. As mentioned above, however, it is also possible to adjust a single LED channel to achieve the desired resultant color. At step 308, the target PWM for each LED channel is recorded for subsequent storage in their respective microprocessors. At step 310, a determination is made as to whether the calibration should be repeated. If the answer is yes, then the process returns to step 302, where the process is repeated. Otherwise, the process is concluded.

Although only two passes have been described, the above calibration process 300 may be performed with two, three, four, or more passes as needed. Theoretically, the resulting discrepancy (if any) in the operating temperature of the LEDs should decrease with each additional pass.

Figure 4:
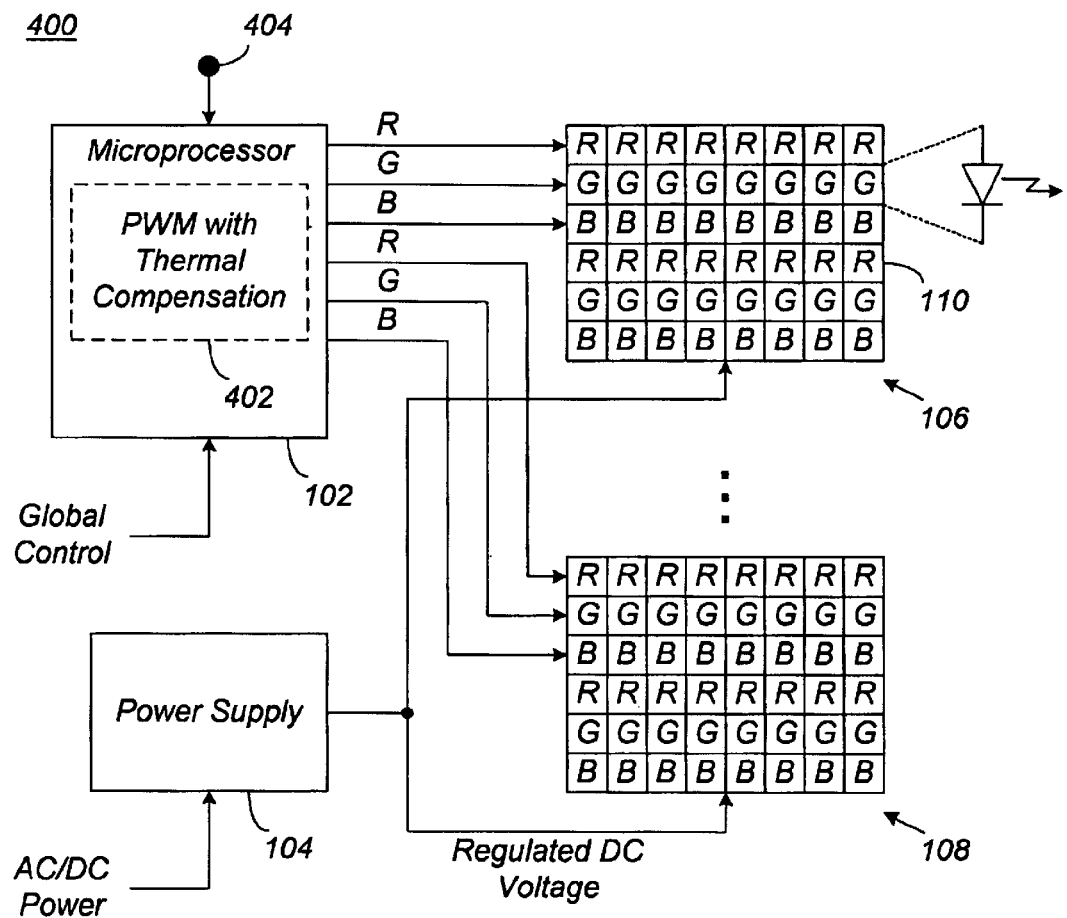
FIG. 4 is a block diagram of a portion of an improved LED based lighting system according to embodiments of the invention.

Referring now to FIG. 4, a portion of an LED based lighting system 400 according to embodiments of the invention is shown. The system 400 is similar to the system 100 shown in FIG. 1, except that the microprocessor 102 includes a new PWM algorithm 402 that has thermal compensation capability. The system 400 also includes a temperature sensor 404 for measuring the operating temperature of the environment in which the arrays 106, 108 of the system are installed. The operating temperature measurements are then provided to the microprocessor 102 and used by the algorithm 402 to compensate for differences in operating temperature between the arrays.

The temperature sensor 404 may be any suitable temperature sensor such as a thermocouple. If necessary, a digital-to-analog converter (DAC) may be used to convert the output of the temperature sensor 404 to a format suitable for the microprocessor 102. For discrete temperature sensors, placement should be close enough to the arrays to obtain a fairly accurate measurement (e.g., within 5%). The arrays are typically mounted close enough together so that a single temperature sensor 404 is usually sufficient for one light fixture.

In some embodiments, the temperature sensor 404 may be built directly into the microprocessor 102 as an on-board temperature sensor. An example of such a microprocessor is the TMS320LF microprocessor available from Texas Instruments, Inc. For on-board temperature sensors, the microprocessor 102 is typically mounted in the same light fixture as the arrays 106, 108 so that any difference in temperature between the microprocessor and the arrays should be within an acceptable range.

In operation, a user selects the desired resultant color from a global control unit. The resultant color is then relayed to the microprocessor 102, where it is processed by the algorithm 402. The algorithm 402 determines which PWM should be applied to the different LED channels in the arrays 106, 108, based on pre-stored calibration data, to achieve the resultant color. After a brief settling period (e.g., 45 mS), the algorithm 402 causes the microprocessor 102 to take a temperature reading of the operating environment. If the difference between the operating temperature and the calibration temperature is greater then a predetermined threshold (e.g., 5° C.), then the algorithm 402 adjusts the pulse width of the PWM for at least one of the LED channels to compensate for the difference in temperature.

Typically, adjusting the red and the green LED channels is sufficient to restore the array to the desired resultant color and it is not necessary to adjust the blue LED channel. It is possible, however, to adjust a different set of colors or only a single color to achieve similar results.

Figure 5:
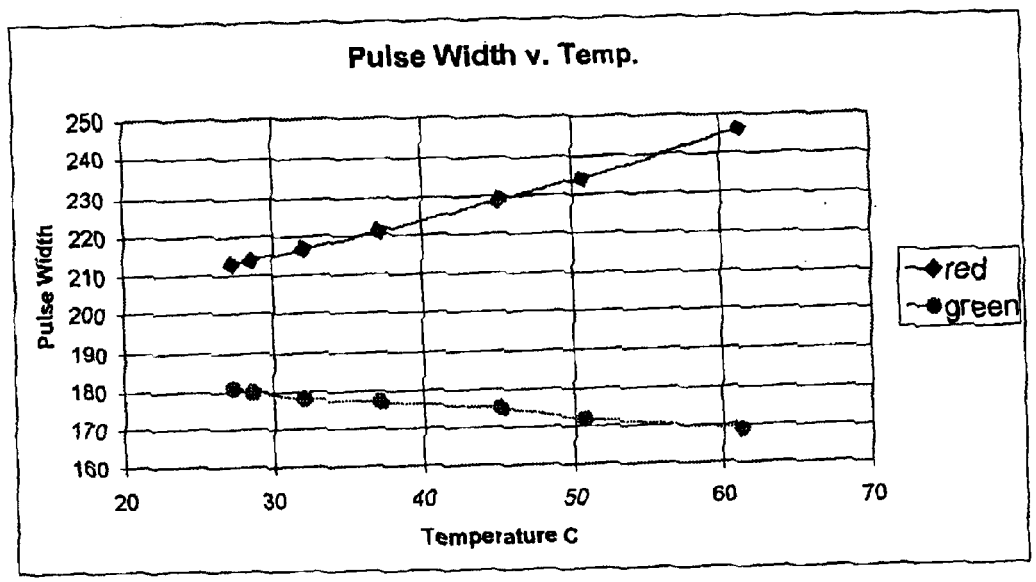
FIG. 5 is a line graph showing the pulse widths needed at various temperatures to achieve a desired resultant color.

Adjustment to the pulse width of the LED channels is performed based on a pulse width versus temperature curve for the LED channels. An example of such a curve for the red and green LED channels is shown in FIG. 5, where the vertical axis represents normalized units of pulse width and the horizontal axis represents operating temperature. As the operating temperature increases, the pulse width needed to maintain an array at the resultant color increases for the red LED channel (top curve), but decreases for the green LED channel (bottom curve).

As can be seen, the slopes of the two curves are substantially linear and, therefore, may be used as correction factors, as follows:

$$\tau_{red}(T) = \tau_{red,\ cal} + \text{Slope}_{red} * (T - T_{cal}), \text{ and}$$

$$\tau_{green}(T) = \tau_{green,\ cal} + \text{Slope}_{green} * (T - T_{cal}),$$

where $\tau$ is the pulse width, $T$ is the measured operating temperature, and $T_{cal}$ is the calibration temperature. In the example above, the slope of the green curve of is approximately $-0.3488$ and the slope of the red curve is approximately $0.9593$.

Where the slope of the pulse width versus temperature curve is non-linear, an appropriate numerical method (e.g., averaging, curve fitting) may be used to approximate the slope.

In some embodiments, instead of using the slope as the correction factor, the actual data for each LED channel may be stored in the microprocessor(s) as a look-up table. Then, the algorithm 402 may simply match the appropriate pulse width from the table to the measured operating temperature.

One way to obtain the pulse width versus temperature curve is to characterize each LED channel in every array. The characterization data for each channel may then be stored in the microprocessor(s), either in the form of a correction factor as described above, or as actual data in a look-up table.

Another way to obtain the pulse width versus temperature curve is to characterize only some of the LED channels, then average the data. The pulse width versus temperature curve from the averaged data may then be applied to all the LED channels.

Note that the pulse width versus temperature curves in FIG. 5 are plotted using data from several temperatures. In some embodiments, it is possible to obtain curves that are based on only two temperatures, for example, the calibration temperature (e.g., 55° C.) and another temperature. Advantageously, the other temperature may be any temperature that the LEDs pass through as they are warming up to the calibration temperature. An estimate of the pulse width versus temperature curve may then be extrapolated from the two data points using any appropriate numerical method.

Figure 6:
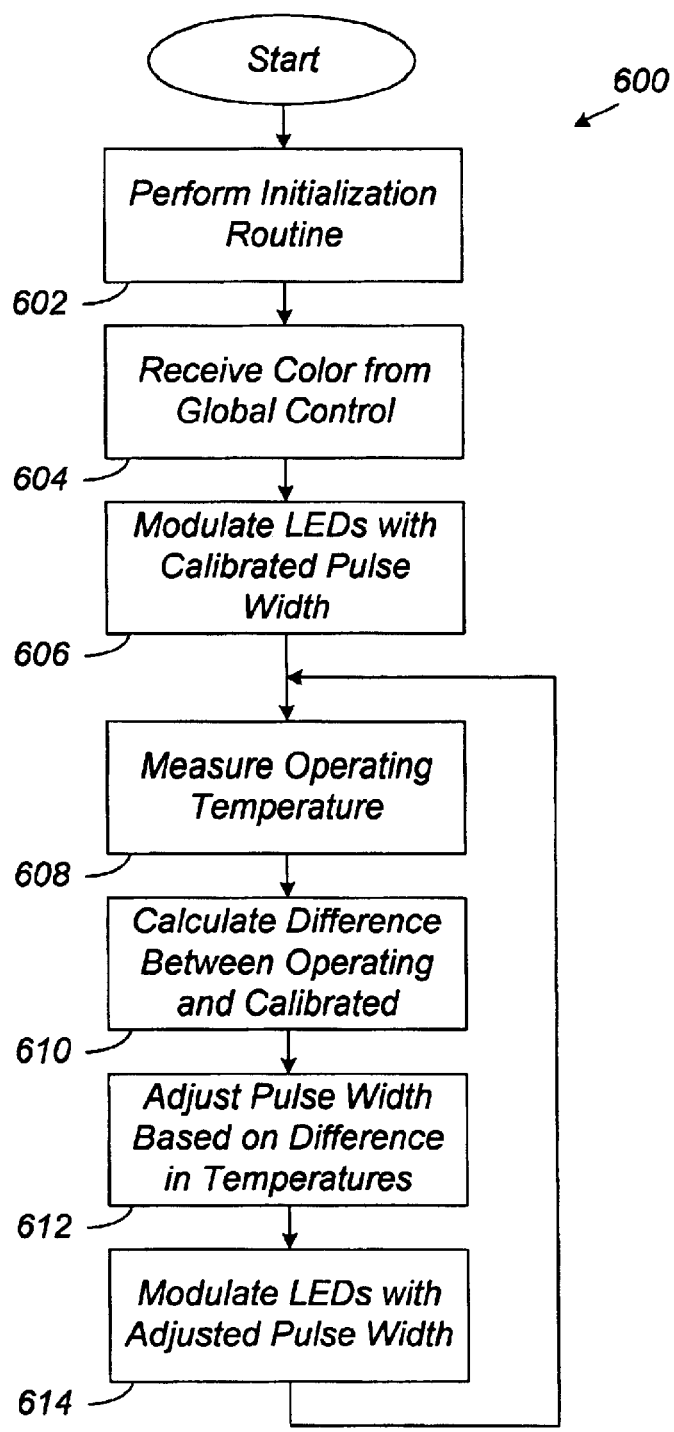
FIG. 6 is a flowchart for a thermal compensation algorithm according to embodiments of the invention.

Referring now to FIG. 6, a method 600 representing an exemplary implementation of the PWM with thermal compensation algorithm 402 is shown. The first step 602 in the method is to perform a warm-up routine that initializes the microprocessor and the arrays. At step 604, a desired resultant color is received from a global control unit. An appropriate PWM scheme for the resultant color is selected at step 606, and the LEDs are modulated on a per channel basis with the selected PWM. At step 608, the operating temperature is measured. In some embodiments, a brief stabilization period may be implemented to allow the LEDs to settle before measurement of the operating temperature. The difference between the operating temperature and calibrated temperature is measured in step 610. If the temperature difference is above a predetermined threshold value, then the pulse width of the PWM is adjusted based on the temperature difference at step 612. In some embodiments, the amount of adjustment may be determined using a correction factor. In other embodiments the amount of adjustment may be determined using a look-up table. At step 614, the adjusted PWM is applied to the LEDs (on a per channel basis). Thereafter, the method 600 returns to step 608 to continue monitoring the operating temperature.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of compensating for color variation due to temperature change in an LED based lighting system having at least one LED array, wherein same color LEDs are electrically connected to form LED channels, the method comprising:
   determining a pulse width needed for at least one LED channel to achieve a predetermined target color at at least a first and a second temperature;
   calculating a pulse width correction factor for the at least one LED channel based on the pulse width needed to achieve the predetermined target color at the at least first and second temperatures;
   correcting the pulse width for the at least one LED channel using the pulse width correction factor to achieve the predetermined target color.

2. The method according to claim 1, wherein the pulse width correction factor is calculated for every LED array in the LED based lighting system.

3. The method according to claim 1, wherein the pulse width correction factor is calculated for some of the LED arrays in the LED based lighting system and then applied to other LED arrays in the LED based lighting system.

4. The method according to claim 1, further comprising calibrating the LED channels, including (a) maximizing an intensity level of one of the LED channels, and (b) adjusting an intensity level of at least one other LED channel until the predetermined target color is achieved.

5. The method according to claim 4, wherein the calibrating step further includes repeating steps (a) and (b) after a predetermined amount of time.

6. The method according to claim 1, wherein the first operating temperature is a calibration temperature.

7. The method according to claim 6, wherein the second operating temperature is less than the first operating temperature.

8. The method according to claim 6, wherein the second operating temperature is greater than the first operating temperature.

9. The method according to claim 4, further comprising detecting an operating temperature of the at least one LED array, wherein the step of correcting is performed only if a difference between the calibration temperature and the operating temperature is above a predefined threshold value.

10. The method according to claim 1, wherein the target color is defined by chromaticity coordinates.

11. An LED based lighting system with thermal compensation capability, comprising:
    at least one LED array having same color LEDs electrically connected to form LED channels;
    a microprocessor connected to and independently controlling each LED channel of the LED array to achieve a desired resultant color;
    a temperature sensor connected to the microprocessor for detecting an operating temperature of the at least one LED array; and
    an algorithm stored on the microprocessor and configured to cause the microprocessor to compensate for differences in the operating temperature of the at least one LED array.

12. The system of claim 11, wherein the algorithm causes microprocessor to compensate for differences in an operating temperature of the at least one LED array by causing the microprocessor to:
    receive the desired resultant color;
    apply pulse-width modulation to each LED channel, the pulse-width modulation having a pulse width calibrated to achieve to the resultant color;
    monitor an operating temperature for the at least one LED array;
    calculate a temperature difference between the operating temperature and a calibration temperature; and
    adjust the pulse width of the pulse-width modulation for at least one LED channel based on the temperature difference.

13. The system of claim 12, wherein the algorithm is further configured to cause the microprocessor to wait a predetermined amount of time for the LED array to stabilize before detecting an operating temperature.

14. The system of claim 11, wherein the temperature sensor is an on-board temperature sensor that is built into the microprocessor.

15. The system of claim 11, wherein the LED arrays are installed as a transportation cabin lighting system.

16. The system of claim 12, wherein the microprocessor adjusts the pulse width of the pulse-width modulation using a correction factor for each LED channel.

17. The system of claim 16, wherein the correction factor for each LED channel is calculated from actual data measured for the LED channel.

18. The system of claim 16, wherein the correction factor for each LED channel is estimated from data measured for one or more other LED channels.

19. The system of claim 12, wherein the microprocessor adjusts the pulse width of the pulse-width modulation using a look-up table.

20. A method of compensating for color variation due to temperature change in an LED based lighting system having at least one LED array, wherein same color LEDs are electrically connected to form LED channels, the method comprising:
deriving a temperature compensation curve for the LED array;
calculating a correction factor for at least one LED channel based on temperature compensation curve; and
compensating for differences in an operating temperature for the LED array.

21. The method of claim 20, wherein the step of compensating includes correcting a pulse width for the at least one LED channel using the correction factor.

22. The method according to claim 20, wherein the compensation curve is a pulse width versus temperature curve, further comprising determining the slope of the pulse width versus temperature curve.

23. The method according to claim 22, wherein the slope of the pulse width versus temperature curve is determined by averaging data from a predetermined number of LED channels.

24. The method according to claim 22, wherein the pulse width versus temperature curve is determined based on at least two data points.

25. The method according to claim 20, wherein the step of compensation is performed only if a difference between an operating temperature and a calibration temperature is above a predefined threshold value.

26. A method of calibrating an LED based lighting system having at least one LED array, wherein same color LEDs are electrically connected to form LED channels, the method comprising:
(a) stabilizing the LED channels;
(b) maximizing an intensity level of one of the LED channels;
(c) adjusting an intensity level of at least one other LED channel until a predetermined target color is achieved;
(d) waiting a predetermined amount of time;
(e) readjusting the intensity level of the at least one other LED channel until the predetermined target color is achieved again; and
(f) storing the intensity levels of the LED channels as calibration intensity levels.

27. The method according to claim 26, further comprising measuring an operating temperature of the LED channels after step (f) and using the measured operating temperature as a calibration temperature.

28. The method according to claim 27, further comprising repeating steps (d)–(f) until a difference in calibration temperature between a current iteration and a previous iteration is below a predetermined threshold.

29. The method according to claim 26, further comprising calculating a pulse width correction factor for the LED channels using the stored calibration intensity levels.

* * * * *